UNITED STATES PATENT OFFICE.

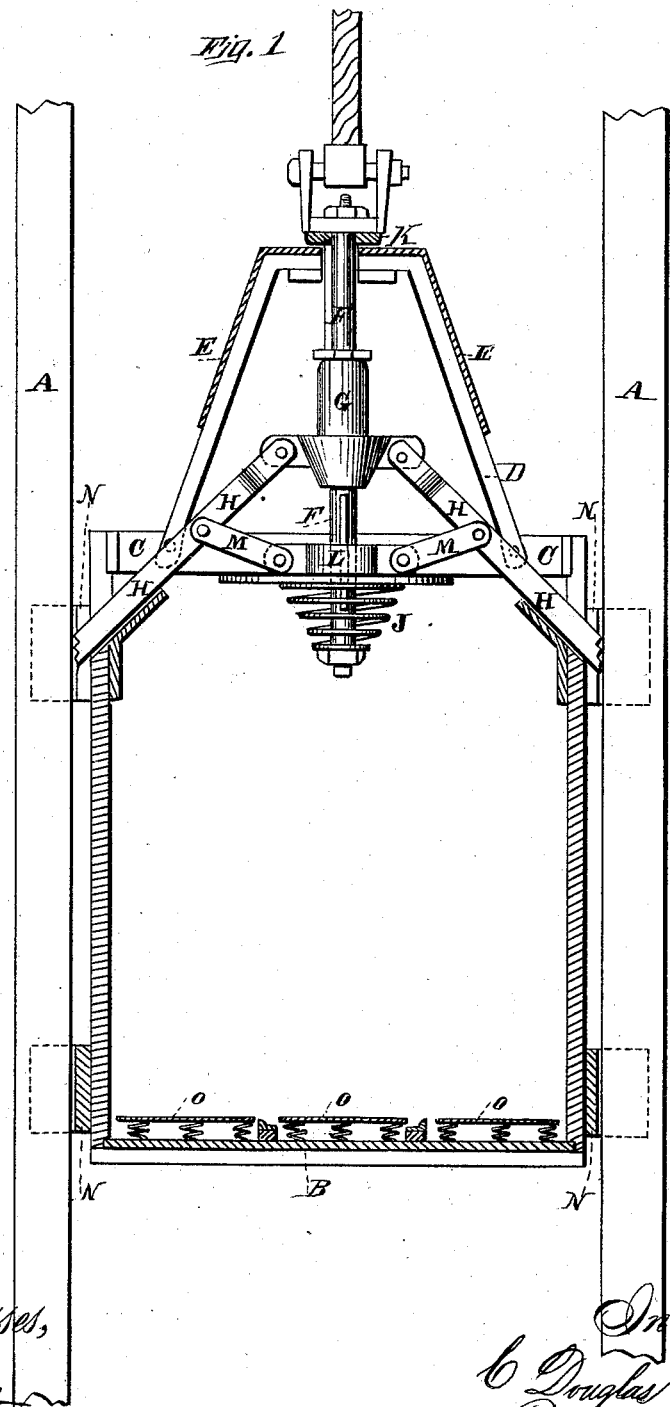

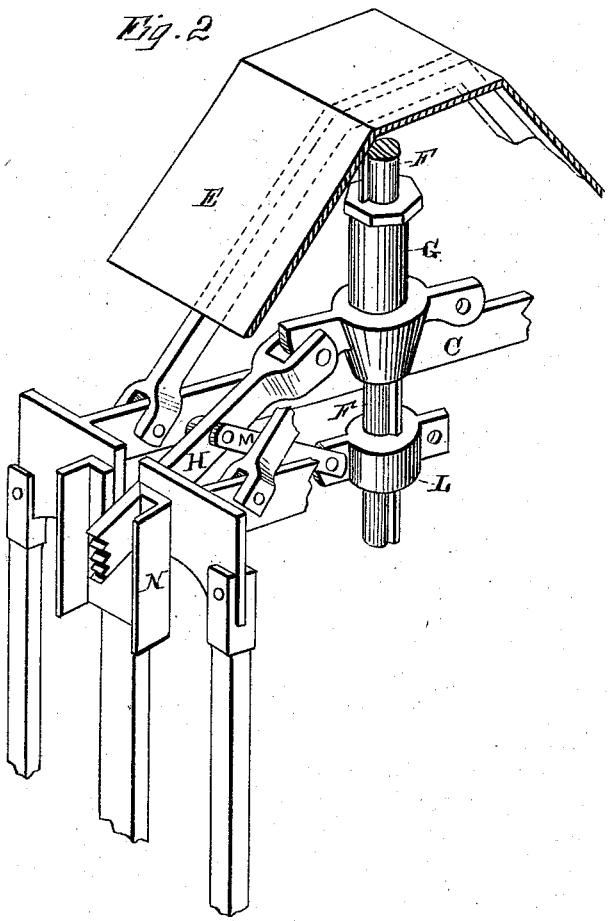

C. DOUGLAS BROWN, OF PRESCOTT, ARIZONA TERRITORY, ASSIGNOR OF ONE-HALF TO WILLIAM Z. WILSON, OF SAME PLACE.

SAFETY ATTACHMENT FOR MINING-CAGES.

SPECIFICATION forming part of Letters Patent No. 242,746, dated June 14, 1881.

Application filed March 25, 1881. (No model.)

*To all whom it may concern:*

Be it known that I, C. DOUGLAS BROWN, of Prescott, county of Yavapai, Arizona Territory, have invented an Improved Safety Attachment for Mining Cages and Elevators; and I hereby declare the following to be a full, clear, and exact description thereof.

My invention relates to certain improvements in attachments for mining and other elevator-cages, by which such cages are prevented from falling if the hoisting-rope or any other part of the machinery breaks.

It consists in the employment of inclined arms having their outer ends formed to engage and hold in the guide-timbers between which the cage moves, while their inner ends are connected with a ring secured to a vertically-sliding spindle or king-bolt having elliptic, spiral, or other springs to draw it down forcibly if the rope breaks, and thus cause the ends of the inclined arms to engage the guide-timbers. As soon as these arms become engaged and fixed in the guides, the whole weight of the cage is transferred to the king-bolt, by which it is suspended, and through it a direct power is exerted to fix the arms in the guides independent of the spring. A sliding ring or sleeve upon the king-bolt below the attachment of the inclined arm is connected with them by stays or bracing arms, which cause both of the arms to be thrown out simultaneously, and equally prevents them from being thrown out too far by the shock, and assist in strengthening and bracing them. The frame of the cage has clips which extend upon each side of the guide-timbers, where the safety-arms will engage them, and thus prevent the timbers from being split by the arms when they are forced into the timbers. Rubber buffers or springs below the nut at the top of the king-bolt relieve the jar when it brings up on the catches, and the platform or floor may also be supported upon springs to relieve the force of the blow.

Referring to the accompanying drawings for a more complete explanation of my invention, Figure 1 is a vertical section of my invention. Fig. 2 is a detail of construction in perspective.

A A show the timbers of the guide-frame of a cage-well such as is employed for hoisting purposes in mining-shafts.

B is the floor of the cage, and C are the upper timbers or iron frame extending across the top of the cage. From these upper cross-timbers an angular frame, D, extends upward, being bolted or otherwise fixed to the cage-frame, and it serves to support a protecting roof, E, which protects the occupants of a cage from falling rubbish or a broken cable.

Through or between the cross-timbers C and through the roof of the cage a king-bolt or spindle, F, passes, having a vertical or end play, and being prevented from turning around by feathers fixed to it and moving in suitable slots or guides. To this king-bolt or spindle is fixed a sleeve, G, having projections at its opposite sides, to which the inner ends of the two safety arms or dogs H are pinned. These two arms extend at an incline downward and outward through slots in the frame, so that their outer ends stand in line with the inner faces of the guide-timbers, (not shown,) between which the cage moves. The ends of these arms H are so formed that they will readily engage with or penetrate the guides when forced outward, and they will thus hold the cage supported from its spindle.

Below the timbers C of the cage are secured one, two, or more elastic springs, J, of any suitable form, as elliptic, spiral, or other kind. The spindle passes through or between the spring or springs, and a strong plate with adjusting and holding nuts at the bottom retains it in place, and also enables me to regulate the tension of the springs. A plate or head at the top of the spindle will serve as a stop when the spindle is drawn down by the spring, and an elastic buffer, K, on the spindle relieves the jar when the cage is suddenly stopped.

A loose or sliding sleeve, L, is fitted to slide upon a feather on the spindle below the fixed sleeve G, and two arms, M, extend from lugs on this sleeve L to a point about midway in the length of the arms H. These short arms, with their sliding sleeve L, act together to hold the arms H, so that they will be thrown outward simultaneously, and will each engage its guide equally with the other, thus preventing any side strain.

Upon the sides of the cage, at top and bottom, are secured clips N, which extend outward upon each side of the guide-timbers, and thus insure the central position of the cage in the shaft. The upper clips are placed upon each side of the slots in the cage-frame, through which the arms H are projected into the guides, and as they project on each side of the guides they will prevent the latter from being split and spread apart by the action of the dogs.

The floor B of the cage has rails upon which cars may be run to be elevated in the usual manner. The spaces at each side of and between the rails may be fitted with a false bottom, O, which rests upon springs, so that the shock of sudden stoppages of the cage will not be communicated so severely to the occupants of the cage.

Having thus described my invention, what I claim as new, and desire to secure by Letters Patent, is—

1. The cage-frame provided with supplemental frame D, spring or springs J, and the sliding adjustable suspending spindle or king-bolt F, with the fixed sleeve G, in combination with the inclined arms H, and the arms M, uniting the arms H with the sliding sleeve L, substantially as and for the purpose herein described.

2. A mining-cage having the supplemental frame D, springs J, sliding spindle F, and the arms H and M, connected with each other and the spindle, as shown, in combination with the elastic buffer K, substantially as herein described.

3. In a mining-cage, the combination of the frame C D, springs J, sliding spindle F, sleeves G L, and arms H M, and the elastic buffer K, and supplemental spring-floor O, substantially as and for the purpose herein described.

In witness whereof I have hereunto set my hand.

C. DOUGLAS BROWN.

Witnesses:
JOHN A. BUSH,
ED. W. WELLS.